Aug. 2, 1955
W. R. L. TORRANCE
2,714,273
LURES FOR FISHING
Filed Dec. 14, 1951
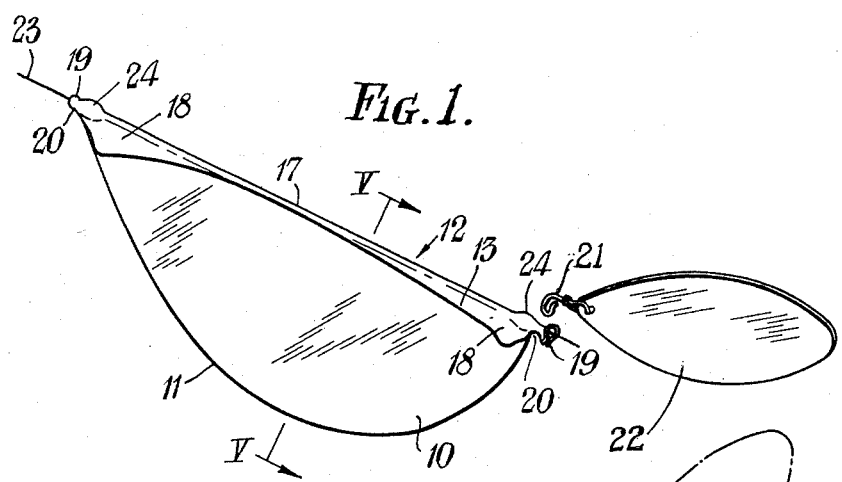
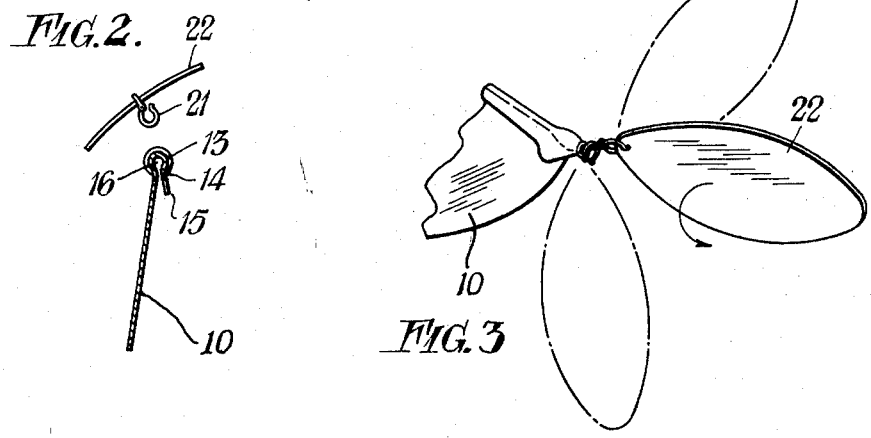
INVENTOR United States Patent Office 2,714,273
Patented Aug. 2, 1955

2,714,273

LURES FOR FISHING

William Robert Lincoln Torrance, Vancouver, British Columbia, Canada

Application December 14, 1951, Serial No. 261,644

Claims priority, application Great Britain December 18, 1950

5 Claims. (Cl. 43—42.18)

This invention relates to lures for use in angling and trawling for fish, and has for its object to provide a device which can be attached readily to a line without injuring the line, whilst affording a ready means of attaching the lure elements or spinners so as to obviate the necessity of having to tie the lure elements or spinners directly to the line.

According to the present invention a member carrying a lure, spinner or the like is formed with a clip or clips by which it is readily detachably secured by a snap-on action to a line, hook, wire shaft or the like.

In order that the invention may be clearly understood and readily carried into effect drawings are appended hereto illustrating an embodiment thereof, and wherein, Figure 1 is a perspective view showing the invention applied to a spinner, one part being shown detached from the other.

Figure 2 is a section on the line V—V of Figure 1, and,

Figure 3 is a broken perspective view of the spinner showing the two parts thereof connected.

Referring to the drawings when the invention is applied to a spinner a clip for attachment to the line, wire shaft or the like can be composed of a light metal or metal alloy of thin sheet gauge shaped predominantly as a flat fin 10 having one edge 11 of curvilinear form, e. g. half-elliptical or half-pear shaped and preferably having one end of part-circular form merging into a large radiused other part as shown, a longitudinal marginal part thereof being folded along a straight edge 12 to form an overhanging longitudinal lip 13 for the full length of the fin, this lip being pinched inwardly as at 14 so as to be of nearly circular cross-section and slightly bowed outwardly as at 15 at its free edge so that the line 23 can be snapped into the channel 16 formed by the folding over of the said lip. The free edge of this lip is for its median part 17 preferably close to its fold so that the depth of the channel to the median part thereof is not much greater than the thickness of the line, and from this median part such free edge merges in curvilinear continuity into deeper end parts to form end tongues 18 which contain the outwardly bowed parts 15 to facilitate the insertion of the line into the channel 16, these end tongues then merging by their free edges back into the end terminal parts of the channel.

The said end or terminal parts of the channel formation are slightly deformed or flared as at 19 to form necks 20 on one or both of which can be gripped by a spring finger 21 or pair of fingers carrying one or a pair of lures or spinners. For this purpose each spinner may be a plate 22 of oval or disc form of polished metal or other suitable material or have any desired shape and has secured to it a relatively small and inconspicuous spring type of hook comprising the spring finger 21 which can be sprung over the appropriate neck 20 at the terminal part of the channel, and the connection of the disc or other shaped lure element or spinner to the hook 21 may be such that the lure element or spinner can rotate freely or it may merely be free to flap relative to the said clip.

To retain the spring finger 21 in position so that it does not move endwise along the clip or the line, the channelled part of the clip, a short distance within the flared terminal parts, can be slightly bulged or pressed outwardly as at 24 so as to form abutments for the hooks.

I claim:

1. An angler's spinner type of lure for attachment to a line comprising a body part bent to channel section of nearly circular form with outwardly flared lips between which the line can be detachably gripped, a neck like construction on one end of said member, a spinner and a snap-on fastener carried by the spinner for detachably clipping the spinner to the neck-like construction.

2. An angler's spinner type of lure for attachment to a line, comprising a fin member having a longitudinal fold along one edge thereof within which the line may be tightly and detachably gripped, a flared extension at one end of the fin in prolongation of said fold, a spinner, and a snap-on hook pivotally connected to the spinner for clipping tightly and detachably about said flared extensoin.

3. An angler's spinner type of lure for attachment to a line comprising a plate shaped as a fin and having a fold to provide a channel section along one edge for embracing the line tightly, a lateral extension from one side of the channel affording a mouth to guide the channelled part of the fin on to the line, a flared neck-like co-axial extension at one end of the channelled part of the fin, a spinner, and a hook-like clip pivotally connected to the spinner for clipping closely upon said neck-like extension.

4. An angler's spinner type of lure for attachment to a line, comprising a plate shaped as a fin and having a fold to provide a channel section along one edge for embracing the line tightly, a lateral extension from one side of the channel affording a mouth to guide the channelled part of the fin on to the line, a flared neck-like co-axial extension at each end of the channelled part of the fin, a spinner, and a hook-like clip pivotally connected to the spinner for clipping closely upon either of said neck-like extensions.

5. An angler's spinner type of lure for attachment to a line, comprising a plate shaped as a fin and having a fold to provide a channel section along one edge for embracing the line tightly, a lateral extension from one side of the channel affording a mouth to guide the channelled part of the fin on to the line, a flared neck-like co-axial extension at one end of the channelled part of the fin, a spinner, a hook-like clip pivotally connected to the spinner for clipping closely upon said neck-like extension, and a bulbous-like enlargement joining the flared neck-like extension to the channeled part of the fin.

References Cited in the file of this patent

UNITED STATES PATENTS

| | | |
|---|---|---|
| 1,512,656 | Ward | Oct. 21, 1924 |
| 1,573,288 | Wilson | Feb. 16, 1926 |
| 1,726,502 | Pflueger | Aug. 27, 1929 |
| 1,778,119 | Neville | Oct. 14, 1930 |
| 1,997,802 | Meyer | Apr. 16, 1935 |
| 2,278,876 | Hart | Apr. 7, 1942 |
| 2,427,267 | Fiskaali | Sept. 9, 1947 |

FOREIGN PATENTS

| | | |
|---|---|---|
| 483,262 | Great Britain | Apr. 14, 1938 |